US010998929B2

(12) United States Patent
Holley et al.

(10) Patent No.: US 10,998,929 B2
(45) Date of Patent: May 4, 2021

(54) TELEPHONE HANDSET CONTAINING A REMEDIAL DEVICE

(71) Applicant: TRUST TECHNOLOGY WORLD DMCC, Dubai (AE)

(72) Inventors: Bruce Holley, Lincolnshire (GB); Joshua Mihill, Grantham (GB)

(73) Assignee: TRUST TECHNOLOGY WORLD DMCC, Dubai (AE)

(*) Notice: Subject to any disclaimer, the term of this patent is extended or adjusted under 35 U.S.C. 154(b) by 0 days.

(21) Appl. No.: 16/469,815

(22) PCT Filed: Dec. 14, 2017

(86) PCT No.: PCT/IB2017/057929
§ 371 (c)(1),
(2) Date: Jun. 14, 2019

(87) PCT Pub. No.: WO2018/109701
PCT Pub. Date: Jun. 21, 2018

(65) Prior Publication Data
US 2020/0091950 A1 Mar. 19, 2020

(30) Foreign Application Priority Data
Dec. 14, 2016 (GB) .................................. 1621239.1

(51) Int. Cl.
H04M 1/00 (2006.01)
H04B 1/3827 (2015.01)
H04M 1/02 (2006.01)

(52) U.S. Cl.
CPC ........ H04B 1/3838 (2013.01); H04M 1/0202 (2013.01)

(58) Field of Classification Search
CPC .......................... H04B 1/3838; H04M 1/0202
(Continued)

(56) References Cited

U.S. PATENT DOCUMENTS 5,544,665 A 8/1996 Litovitz et al.
5,566,685 A 10/1996 Litovitz et al.
(Continued)

FOREIGN PATENT DOCUMENTS

CN 201414156 2/2010
EP 2393731 A1 12/2011
(Continued)

OTHER PUBLICATIONS

Transmittal of International Preliminary Report on Patentability for Application No. PCT/IB2017/057929 dated Jun. 27, 2019.
(Continued)

Primary Examiner — Kathy W Wang-Hurst
Assistant Examiner — Max Mathew
(74) Attorney, Agent, or Firm — The Dobrusin Law Firm, P.C.; Daniela M. Thompson-Walters

(57) ABSTRACT

A remedial signal for potentially harmful radiation that is emitted by a portable electronic battery powered communication device is implemented directly within the handset of the portable communication device the portable communication device is operated by a microprocessor (3) and the remedial signal module is controlled by an algorithm in the microprocessor (3) wherein the algorithm obtains information concerning radio frequency communications associated with the portable telecommunications device from the transceivers (1) of the device.

20 Claims, 2 Drawing Sheets

(58) Field of Classification Search
USPC .... 455/575.5, 550.1, 114.1, 556.1, 572, 456, 455/404.1, 90, 425, 55; 374/76.15; 607/3; 702/189
See application file for complete search history.

(56) References Cited

U.S. PATENT DOCUMENTS

| | | |
|---|---|---|
| 6,263,878 B1 | 7/2001 | Litovitz et al. |
| 6,564,038 B1 | 5/2003 | Bethea |
| 6,947,000 B2 | 9/2005 | Ito |
| 6,957,051 B1 | 10/2005 | Korisch et al. |
| 6,985,113 B2 | 1/2006 | Nishimura et al. |
| 7,672,698 B2 | 3/2010 | Kang |
| 8,155,721 B2 | 4/2012 | Shanks et al. |
| 8,290,550 B2 | 10/2012 | Kodama |
| 8,604,996 B2 | 12/2013 | Xu et al. |
| 9,124,348 B2 | 9/2015 | Kimura et al. |
| 9,571,146 B2 | 2/2017 | Penafiel |
| 2002/0011828 A1* | 1/2002 | Wallach ............... H04B 1/3838 324/76.15 |
| 2002/0016155 A1* | 2/2002 | Charbonnier ........ H04B 1/3838 455/67.11 |
| 2005/0153754 A1 | 7/2005 | Shanks et al. |
| 2008/0014872 A1* | 1/2008 | Tucek ................... H01Q 17/00 455/106 |
| 2008/0091238 A1* | 4/2008 | Colliard ................... A61N 1/16 607/3 |
| 2010/0056210 A1 | 3/2010 | Bychkov |
| 2010/0113111 A1* | 5/2010 | Wong ................... H04B 1/3838 455/575.5 |
| 2010/0125438 A1* | 5/2010 | Audet ................ G01R 29/0814 702/189 |
| 2010/0203862 A1* | 8/2010 | Friedlander .......... H04B 17/318 455/404.1 |
| 2011/0090126 A1* | 4/2011 | Szini ..................... H01Q 21/29 343/702 |
| 2013/0203363 A1 | 8/2013 | Gratt et al. |
| 2013/0278067 A1* | 10/2013 | Poss ..................... B65F 1/1468 307/62 |
| 2013/0303092 A1* | 11/2013 | Penafiel ............... H04B 1/3838 455/73 |
| 2015/0349829 A1 | 12/2015 | Penafiel |
| 2017/0063417 A1* | 3/2017 | Butner ................... H04W 24/08 |
| 2017/0126266 A1* | 5/2017 | Butner ................... H04B 17/30 |
| 2017/0358849 A1* | 12/2017 | Butner ..................... H01Q 9/04 |

FOREIGN PATENT DOCUMENTS

| | | |
|---|---|---|
| EP | 1298809 A | 4/2012 |
| EP | 2768150 A1 | 8/2014 |
| GB | 2482421 A | 2/2012 |
| GB | 2484167 A | 4/2012 |
| GB | 2484168 A | 4/2012 |
| GB | 2484169 A | 4/2012 |
| GB | 2523737 A | 9/2015 |
| GB | 2524720 A | 10/2015 |
| GB | 2533804 A | 7/2016 |
| IE | 2010/0660 A1 | 4/2012 |
| JP | 2004298646 | 10/2004 |
| JP | 2009544217 | 12/2009 |
| WO | 1995/001758 A1 | 1/1995 |
| WO | 1997/019647 A1 | 6/1997 |
| WO | 2002/000468 A1 | 1/2002 |
| WO | 2005/112593 A2 | 12/2005 |
| WO | 2010/090935 A1 | 8/2010 |
| WO | 2012/041514 A1 | 4/2012 |
| WO | 2015/124689 A1 | 8/2015 |
| WO | 2015/124744 A1 | 8/2015 |
| WO | 2016/108179 A2 | 7/2016 |
| WO | 2016/203444 A1 | 12/2016 |
| WO | 2018/109701 A2 | 6/2018 |
| WO | 2018/109701 A3 | 6/2018 |

OTHER PUBLICATIONS

International Search Report and Written Opinion for Application No. PCT/IB2017/057929 dated Aug. 24, 2018.

UK Search Report Under Section 17 for Application No. GB 1621239.1 dated May 16, 2017.

* cited by examiner

TELEPHONE HANDSET CONTAINING A REMEDIAL DEVICE

FIELD

The present invention relates to methods and apparatus for protecting living systems from potentially adverse effects upon them from electric fields, magnetic fields and electromagnetic fields. The invention is particularly concerned with protection from potentially adverse radiation from modern day battery powered mobile telecommunications handsets which are used for a variety of functions including both voice and data transmission. In particular the invention is concerned with protection when the handset is used in close proximity to the body, in particular the head, as is often the case during voice transmission.

BACKGROUND

All electromagnetic radiation consists of oscillating electric and magnetic fields and the frequency, which is the number of times per second at which the wave oscillates, determines their properties and the use that can be made of them. Frequencies are measured in hertz or Hz, where 1 Hz is one oscillation per second, 1 kHz a thousand, 1 MHz is a million, and GHz, is a thousand million. Frequencies between 30 KHz and 300 GHz are widely used for telecommunications, including broadcast radio and television, and comprise the radio frequency band.

Cellular mobile services operate at frequencies authorised by governments and typically operate within the frequency ranges 800-3000 MHz and they may operate at different frequencies in different countries or continents. Examples of currently authorised frequencies are the following bands to the terrestrial mobile telecommunications IMT-2000: 806-960 MHz, 1,710-2,025 MHz, 2,110-2,200 MHz and 2,500-2,690 MHz. More information can be found at http://en.wikopedia.org/wiki/cellular-frequencies. These frequencies are within the microwave frequency band which encompasses the range between 300 MHz and 300 GHz. Other applications within this range include radar, telecommunication links, satellite communications, weather observation and medical diathermy. This invention is particularly useful with devices that operate on frequencies used for cellular telephones.

A radio frequency wave used to carry information in radio communications is referred to as a carrier wave. The radio frequency carrier wave of any system is produced by the transmitter as a sine wave, or other regular waveform. A carrier wave conveys no information if its properties do not vary in time. If the carrier wave is to convey any information, for instance, speech, music or digitized data, this information has to be added to it in some way. The process of varying one or more properties of a carrier signal with respect to the information that it is to carry is known as modulation. Properties of the carrier wave that may be varied through modulation include for instance, amplitude, frequency, phase or any combination of these. For example, for AM (amplitude modulation) transmission, the electrical signal from a microphone produced by speech or music is used to vary the amplitude of the carrier wave, so that at any instant the size or amplitude of the RF carrier wave is made proportional to the size of the electrical modulating signal. In FM (frequency modulation), the instantaneous frequency of the carrier deviates from the carrier frequency by an amount dependent on the strength of the modulating signal. Phase modulation (PM) is a form of modulation that represents information as variations in the instantaneous phase of a carrier wave. FM and PM are very commonly used for current day radio communications.

A mobile phone (cell phone) sends and receives information (voice messages, text messages, emails, fax, computer data, downloads information etc.) by radio communication. Radio frequency signals are transmitted from the phone to the nearest base station and incoming signals (carrying the information from the source to which the phone user is listening) are sent from the base station to the phone at a slightly different frequency. Base stations link mobile phones to the rest of the mobile and fixed phone network. Once the signal reaches a base station it can be transmitted to the main telephone network, usually by an optical fibre network.

Each base station provides radio coverage to a geographical area known as a cell. Base stations (BS) are connected to one another by a mobile services switching centre (MSC), which tracks calls and transfers them as the caller moves from one cell to the next. An ideal network may be envisaged as consisting of a mesh of hexagonal cells, each with a base station at its centre. The cells overlap at the edges to ensure the mobile phone users always remain within range of the base station. Without sufficient base stations in the right locations, mobile phones will not work. If a person with a mobile phone starts to move out of one cell into another, the controlling network hands over communications to the adjacent base station.

There are conflicting views as to the effects of electric fields, magnetic fields and electromagnetic fields on living systems. However there is considerable evidence showing that certain fields are able to trigger a range of biological effects in various biological systems and that these effects may be damaging to living systems including humans. There are now also a growing number of studies linking mobile phone use to serious health issues such as childhood leukemia, brain tumours and fertility. It may also be that the detrimental effects are long term and their full impact has not yet been realised. WO 02/00468 recognises that the reaction may be harmful and provides a system that detects radiation and issues a warning if it is considered harmful. It does not however take any remedial action to rectify the situation.

There has been a dramatic increase around the world in the use of electrically operated devices particularly battery powered hand held mobile telephones. All such devices have associated with them electromagnetic field emissions which, to varying degrees, have the potential to affect human health. Of particular interest are devices that transmit radio frequency (RF) signals and are used in close proximity to the human body particularly the head, for instance hand held cellular phones and other personal communication devices. At issue is the possibility that the safety standards under which these devices are manufactured, which establish RF exposure limits to the users of these devices, may not adequately account for effects below the thermal threshold, that is, at exposure levels well below levels that can produce measureable heating and can be attributed to direct energy transfer. The potential for such low level effects is supported by substantial evidence from epidemiologic studies and laboratory research which suggests that any measures that could reduce and/or minimize the effects of such exposure would be beneficial to the users of these devices. Laboratory research also suggests that the severity of impact from RF exposure at non-thermal levels is dependent on the modulation characteristics of the RF signal, in particular amplitude variations in the low frequency envelope. Signals that display a greater degree of regularity have been shown to have greater biological impact.

Modern mobile devices include a wide range of services which employ complex communication schemes operating in different modes (GSM, 3G, 4G etc.). In the operation of such devices, the modulation characteristics of transmitted RF signals can vary substantially depending on the mode of operation and the type of information that is being transmitted, for instance, voice or data. Accordingly, the extent of biological effects can also vary. It is therefore desirable that a remedial system be capable of assessing the nature of the modulation to determine the potential extent of biological impact. Furthermore, such a remedial system should be compact and adaptable for use in different telephone handsets. Additionally it is desirable that the remedial system operates effectively, is only used when required as determined by the mode of operation of the personal communication device and hence consumes little power from the battery to preserve battery life.

U.S. Pat. No. 5,544,665 is concerned with the protection of living systems from the harmful effects of electromagnetic fields and states that certain fields have an effect on the enzyme ornithine decarboxylase. The patent states that the potentially damaging effect can be reduced or eliminated if the detrimental electromagnetic field is altered either by switching the field on and off or superimposing an electromagnetic noise field upon it. The patent further states that the effect can only be reduced if such alteration causes relevant characteristic properties of the field to change in time at intervals of less than 5 seconds and preferably at intervals from 0.1 to 1 second. The characteristic properties that can be changed are said to be frequency, phase, direction, waveform or amplitude. Similar effects are discussed in Bioelectromagnetics 14 395-403 (1993) and Bioelectromagnetics 18 388-395 (1997).

U.S. Pat. No. 5,544,665 dates from 1991 and describes various applications of the bio-protection scheme including applications to cellular telephones of the type available at that time which were bulky and used only for voice transmission. The EMX Corporation has promoted batteries for such cellular telephones that make use of the technology described in U.S. Pat. No. 5,544,665. When used with a cellular phone, these batteries are said to produce an electromagnetic noise field that is superimposed over the local RF field generated by the operation of the telephone for voice transmission thereby causing the total field to be irregular and thus not likely to cause biological effects. The noise was generated by a coil forming part of the battery pack. Activation of the noise was accomplished by monitoring the flow of electric current from the battery to the phone and using this as an indirect means to determine when the phone was transmitting RF fields that were likely to produce biological effects. This activation technique worked reasonably well with older phones but proved to be unreliable with newer phones that now have many more applications that demand power from the battery but do not produce RF fields. Use of such applications could cause false triggering of the noise and potentially unnecessary and unacceptable reduction in battery life.

GB Patent Application 2482421 A provides a system involving a personal communication device such as a mobile telephone and when the device is in operation the system outputs a low frequency modulated RF confusing field from an RF transmitter located within the personal communication device. There is no differentiation of the type of signal emitted by the device and hence the confusing field is applied when it may not be needed, this is costly and the constant generation of the confusing signal is power consuming.

In WO 2012/041514 we describe technology that addresses these issues and provides a process, an apparatus and systems for the reduction or elimination of the potentially harmful effect on humans or animal life caused by exposure to electromagnetic fields produced by devices that operate by transmitting RF signals. The technology comprises a device provided with separate means to reduce or eliminate the potentially harmful effect of the RF signals and further provided with a module that senses and analyse RF fields and assesses their ability to produce biological effects. This module then activates the means to reduce or eliminate the potentially harmful effect of the measured RF signals on humans or animal life based on the outcome of that assessment. The module may be provided as a separate unit within the communication device.

It has been proposed that a remedial signal for potentially harmful radiation that is emitted by a portable electronic battery powered communication device can be generated by means of a separate circuit provided within the communication device. The circuit comprising an antenna for detecting the potentially harmful radiation, an analytical module that analyses the detected signal to determine if it is potentially harmful, if so to generate a remedial signal which is preferably a low frequency magnetic field. The module being operated by a separate microcontroller which activates the remedial signal generator which has been described as being a component such as a coil associated with the battery of the communication device.

The operation of modern day portable telecommunication systems relies on the handset microprocessor which gathers various wireless communication data from the handset transceivers and implements the appropriate activities within the handset. According to PCT publication (as before) provide an additional algorithm (the remedial algorithm) within the handset microprocessor the microprocessor can additionally control the operation of a remedial signal module such as a low frequency magnetic field. The algorithm therefore operates within the handset microprocessor and can be stored in the programme memory.

In our PCT application PCT/IB2015/060021 we describe how a remedial signal generator can be incorporated into a telephone handset and the provision of an appropriate remedial signal can be controlled by the microprocessor that provides the operating system of the telephone. The present invention provides improvements to the technology described in PCT application PCT/IB2015/060021.

SUMMARY

A system for the generation of a remedial signal for potentially harmful radiation that is emitted by a portable electronic battery powered communication device wherein the bioprotection system is implemented directly within the handset of the portable communication device in which the portable communication device is operated by a microprocessor and the remedial signal module is controlled by an algorithm in the microprocessor wherein the algorithm obtains information concerning radio frequency communications associated with the communication device from the transceivers of the device and also ensures that the remedial signal does not impair the function of other components of the device.

DETAILED DESCRIPTION

The provision of the remedial signal can interfere with other operations of a modern day cellular telephone. For example many phones are now able to take photographs and it is necessary to stabilise the camera function of the telephone to enable effective and accurate photography. We have found that the provision of the remedial signal can disrupt the stabilisation of the camera function. Accordingly, in one embodiment of this invention the remedial signal is deactivated when camera stabilisation is in operation. This may be accomplished by the provision of means within the microprocessor in the handset that detects when camera stabilisation is in operation and overrides or halts the remedial signal. Alternatively the component that stabilises the camera can be shielded from the device (such as a coil or antenna) that provides the remedial signal either by positioning the two components in locations where they cannot interfere with each other or by physically shielding one from the other. The latter is not preferred as it adds an additional component to the system, taking up room in an already very crowded telephone handset.

Modern day telephone handsets contain large amounts of components, electronics, circuity within a very limited space and the trend is to provide more and more facilities without increasing the size of the handset or maybe even reducing the size of the handset. It is therefore important that the components are optimally positioned relative to each other to get the best performance from the smallest possible component. The remedial signal generator which according to PCT application PCT/IB2015/060021 is controlled by the microprocessor in the handset is typically a coil or an antenna. Accordingly in order to optimise performance the signal generator should be mounted in close proximity to the transmitters within the handset which are responsible for the generation of the potentially harmful radiation. In this way the remedial signal can be aligned with the signal from the transmitters to provide maximum signal coupling and hence the optimum remedial effect. This also allows the remedial signal generating component to be as small as possible and is preferably a coil or an antenna of thickness not greater than 3 mm preferably no greater than 2 mm. Several generator components can be provided in a single telephone handset in order to allow them to be small and yet have the maximum desired remedial effect.

In operation the remedial algorithm obtains information concerning radio frequency communications associated with the portable telecommunication device from the transceivers of the device. Such information includes the RF communications mode (voice or data, GSM, 3G or 4G etc.), and can also include the power level and timing of the RF signal, this information is then used to determine if a remedial signal is required and if so the nature, strength and duration of the signal that should be generated.

Figure 1:
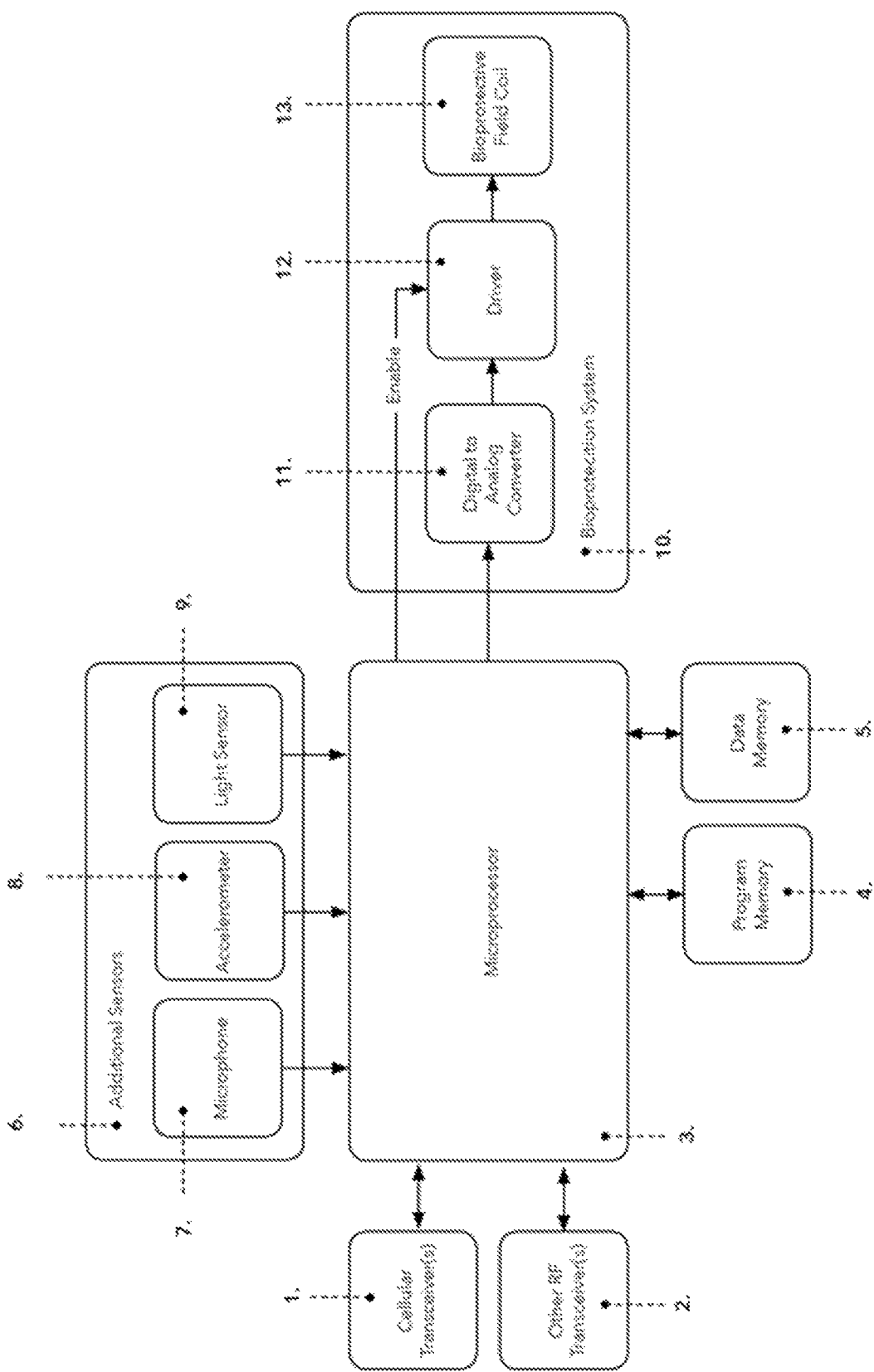
FIG. 1 illustrates a block diagram showing how the mode of operation of a handset can be monitored.

FIG. 1 provides a block diagram showing how the mode of operation of the handset can be monitored and the requirements for a remedial signal can be assessed, an appropriate remedial signal activated by an algorithm within the handset microprocessor and an override can be provided when other components are functioning to ensure their function is not imputed by the remedial signal.

Accordingly the invention provides a battery powered personal communication device operated by a microprocessor wherein the microprocessor contains means for assessment of the risk of the generation of potentially harmful radiofrequency radiation produced by such devices together with means activatable according to the assessment of the risk for the activation of a remedial device for the reduction or elimination of the potentially harmful effect on humans or animal life caused by exposure to such radiation and further provided with means to ensure that the signal provided by the remedial device does not adversely impact the function of other components within the handset.

The design minimizes the number of components required, saves space and is more economical to produce. Additionally it minimizes power consumption. In the preferred embodiment means are provided to monitor the power drain on the battery and the application conditions are monitored and the maximum power drain is set accordingly. Power drain can be set to be at its lowest when the battery is in storage, somewhat higher when the battery is connected to the phone and battery voltage is above a certain acceptable level, and highest but still as low as possible when RF is being generated and needs to be assessed. In all cases battery voltage is measured and in the last two environments both battery voltage and the RF signal are measured. The power management control may conveniently be implemented by software which is executed within the microprocessor.

Rather than depleting the battery by applying the protection signal until the battery is fully depleted, battery monitoring can ensure that sufficient battery life remains to allow for cellular communication. The monitoring function does not consume significant energy, and therefore it need not be disabled. It is one of the many tasks which execute concurrently on the cell phone. By monitoring battery voltage, and limiting protection signal generation to use above a certain battery voltage, the user has the ability of using the cellular telephone near the end of battery life (emergency communications, for example) without the protection signal depleting the battery.

The microprocessor in the handset monitors the communications mode (GSM, 3G, 4G) and handset mode (voice or data) and output power of wireless transceivers in the cell phone. Using this information, the microprocessor determines when to activate the protection signal. In general, amplitude variation patterns for voice transmission are different than for data transmission and are characteristic of signals that are more likely to cause biological effects. Furthermore, voice transmission often implies proximity of the handset to the head which also increases the likelihood of biological effects. Therefore, identification of the communication mode is important in the determination of potential biological impact. Accordingly, identification of the communication modes can be used to determine the required level of the remedial signal. By way of example the microprocessor can differentiate between GSM voice communication mode, GSM data communication mode, 3G or 4G voice communication mode and 3G or 4G data communication mode. The differentiation is preferably performed by an analytical module within the handset microprocessor that is programmed to detect the different communication modes.

The remedial signal can then be activated according to the communication mode and handset mode as determined by the microprocessor and the strength of the remedial signal can be tailored to the mode of operation and the radiation it will generate. For example, if the remedial signal strength in relation to GSM voice communication is deemed to be 100%, for voice communication for 3G, 50% may be sufficient whereas for 3G data communication 25% may be required. The microprocessor can be programmed to cause the remedial signal generator to provide signals of the appropriate strength according to the analysis of the signals received. The strength of the potentially harmful radiation varies depending on the location and proximity to a base station and the microprocessor can monitor the strength of the possibly harmful radiation. The power of the remedial signal can be tailored to the mode of operation as described in PCT application PCT/IB2015/060021 and it can also be continuously and simultaneously tailored to the power or strength of the potentially harmful radiation either matching the power levels of the two signals or allowing them to vary proportionate to one another. In a preferred embodiment the strength of the remedial signal is always greater than or equal to the strength of the potentially harmful radiation and the root mean squared value may be used as the measure of strength. The remedial signal is preferably a magnetic field, more preferably a random low frequency magnetic field.

In our preferred design the handset microprocessor operates the entire system and it also operates a timer to check periodically if the potentially harmful signal is present. In operation the microprocessor recognises the communication mode and handset mode that are operating and determines the level of protection that should be applied. The invention therefore employs a microprocessor programmed to recognise key characteristics of the entire phone system to determine whether biological effects are likely to occur and whether the protective signal is required and that it does not impair other functions.

The invention therefore allows the strength of the remedial signal to be tailored according to the nature of the potentially harmful radiation which in turn depends upon the detected mode of operation of the telecommunication handset and the varying power or strength of the potentially harmful radiation.

In the preferred embodiment means are also provided to monitor the power drain and the application conditions are monitored and as discussed the power drain is set accordingly. As discussed the power management control may conveniently be implemented by software which is executed within a microprocessor and many functions can be implemented within such a microprocessor. In particular it can monitor parameters such as battery voltage: sourced from circuit that connects to the battery. The microprocessor monitors the operational modes of the handset. The microprocessor also activates output parameters such as the Bioprotection noise signal. Furthermore it also ensures that the remedial signal does not impair the function of other systems within the handset. Additional functions which can be implemented in the software include application state classification and power management, implementation of application state monitoring, control algorithms and to determine whether the device is operating in voice mode such as analog to digital conversion means from the microphones or through the use of a Bit Chip Set used to modulate voice data.

The invention may be applied to most electronic devices that operate by transmitting RF signals which could be potentially harmful to human or animal life, but it is particularly useful with battery powered personal communication devices, such as cellular telephones, that are used in close proximity to the human body particularly to the head. The invention provides a system that can be readily used with a variety of mobile phone designs and their associated batteries and accessories.

Earlier studies have shown that RF radiation can cause potentially harmful effects if it is regular, meaning that it has constant properties, and is continuously applied for periods of over 10 seconds and that the potential harm can be substantially eliminated if the regularity period is reduced to no more than 1 second. The means to eliminate the potential harm used in the present invention may superimpose an electromagnetic noise field on the potentially harmful radiation to produce a combined field that is irregular in time, meaning that it does not have constant properties in time, and therefore no longer has the potential to cause harm. Use of the noise field, which is also referred to as the remedial signal, allows for use of the electronic device without altering the manner in which it operates.

The invention is particularly useful with modern day multifunctional battery operated personal communication devices. In the preferred embodiment the potentially harmful effect of the RF radiation is inhibited by a means that generates an appropriate remedial signal that is superimposed on the RF signal to provide a combined signal that is irregular and therefore has no bio-effecting consequence. Any suitable means may be used but the means may comprise an inductive coil which is activated to produce the remedial signal field, primarily magnetic in nature, employing power from the battery of the cellular telephone, as mentioned previously the means should be as small as possible consistent with the required performance. One or more coils of thickness no more than 3 mm have been found to be particularly useful.

The preferred system comprises an electronic circuit that comprises a microprocessor that determines the communications mode and handset mode and the power of the potentially harmful radiation, and determines from this the level of protection to apply before activating the appropriate protection and then continuing to monitor and vary the remedial signal depending on any ongoing changes to the potentially harmful radiation.

The invention therefore provides more specifically, a remedial device within the handset of a battery powered personal communication device that emits RF transmissions potentially harmful to humans or animal life, the remedial device being activated by a microprocessor which determines the communications mode and handset mode and deduces the presence of said RF transmissions. The remedial device includes a remedial signal generator means, being arranged to establish a remedial electromagnetic field in the vicinity of the handset. The handset also includes means that monitor the other functions of the handset components which activates means to ensure they are not adversely impaired by the remedial signal such as by temporarily terminating the remedial signal or shielding the other function. In a preferred embodiment power management is implemented to conserve battery power. The determination of communication and handset modes differentiates between signals generated by voice communication and those generated by other forms of communication such as data communication and on this basis activates the appropriate remedial signal deemed to be required for the particular communication and/or handset mode.

The mode sensing by the handset microprocessor enables supply of power from the handset battery to said remedial signal generator (or selected parts thereof). The remedial signal generator may include a remedial signal control module, which provides a control signal to the power source, and a control signal to a remedial signal generator module, for generating the desired form of remedial signal. Control of the remedial signal is responsive to the sensing by the microprocessor, and employs the handset microprocessor to execute one or more algorithms for controlling the remedial signal generator.

The remedial signal generator may include a digital noise generator, which is coupled through digital to analogue conversion means and filter means, for providing an analogue form of the remedial signal, to a coil which provides a means for establishing the remedial field in the neighbourhood of the handset.

The radiation with which this invention is particularly concerned is that emitted by the cellular telephone when it is transmitting or receiving information especially voice information and particularly when it is transmitting voice information as this tends to generate more RF signals and in particular when it is transmitting or receiving speech as that is generally the time when the telephone is in closest proximity to the head, and transmission radiation occurs for a significant length of time so increasing the likelihood of inducing harmful biological effects.

In operation therefore the cellular telephone will be activated for use and may immediately generate the potentially harmful radiation at the particular predetermined frequency. That the radiation may be harmful will be determined by the microprocessor sensing the communication mode and the handset mode in operation and, if deemed to be required the microprocessor will then activate the remedial signal (noise) generator means that converts the constant potentially harmful radiation to a random benign wave pattern. The microprocessor can also detect when communications end and the potentially harmful radiation is no longer being generated and can then deactivate the remedial signal until the next time that it is required. Negation of the potentially harmful effect of the radiation generated by use of a cellular telephone can be achieved with a remedial signal, preferably an electromagnetic signal, having a frequency preferably in the range 30 Hz to 90 Hz preferably in the range 40 Hz to 60 Hz.

Furthermore, the microprocessor can detect which other functions of the device (such as the camera function) are in operation and ensures that their function is not impaired by the remedial signal. If a function is potentially impaired by the remedial signal means are provided to overrule the bioprotection system and ensure that the remedial signal is not activated or that it is deactivated when the function is in use.

PCT publication WO2015/124744 describes how a microprocessor positioned within the handset can monitor the microphone of the handset to determine if the user is speaking. This information can be used to alter the remedial signal according to the proximity of the handset to the user to optimise the protection. This invention makes use of additional sensors that may be found in the communications device such as an accelerometer and a light sensor in order to help more accurately determine the proximity of the device to the user. The estimated proximity can be calculated using an algorithm in the microprocessor. Proximity of the radiation emitting device is a key factor in ascertaining the likelihood and extent of the biological effects being induced by electromagnetic radiation. Use of data from these sensors alongside core data collected from the transceivers allows the device to make a good assessment of when the remedial signal should be applied and may also be used to tailor the remedial signal depending on the estimated proximity of the device to the user. In an alternative and simplified embodiment one or a number of sensors including but not limited to the microphone, accelerometer and light sensor may be used as the sole means of determining when protection is required. The additional sensors provide means to estimate the proximity of the device to the user which may also be useful in terms of scientific research and hence it may also be useful to record the information.

When the remedial device is integrated into the handset it is important that the user is able to interact with the device and as such the invention provides means to inform the user when the remedial device is active. More specifically the software may facilitate the appearance of an icon on the screen of the handset that indicates that the remedial device is either monitoring or active. The device may also work with a user facing application that allows the user to access and view information that is recorded by the remedial device and also control operational aspects of the remedial device.

The invention is illustrated by reference to the accompanying figure which is a schematic drawing of the components which may be present within a cellular telephone handset (not shown) for performance of the invention.

The handset contains cellular transceivers (1) and other radio frequency transceivers (2) for performing the various functions required of the cellular telephone. The microprocessor (3) operates the transceivers and also receives digital information from the transceivers indicating the mode of operation of the telephone and the extent of the operation. The microprocessor contains program memory (4) and optionally data memory (5). Additional sensors (6) including a microphone (7) an accelerometer (8) and a light sensor (9) may provide additional data information to the microcontroller (3). The program memory of the microprocessor assesses the information received from the transceivers and additional sensors and determines if the mode of operation and proximity will cause potentially harmful radiation. If this is deemed to be the case the microprocessor will activate the bioprotection system (10) by sending a digital signal to a digital/analogue converter (11) and the converted signal activates the driver (12) to provide the desired remedial signal from the bioprotective field coil (13).

Figure 2:
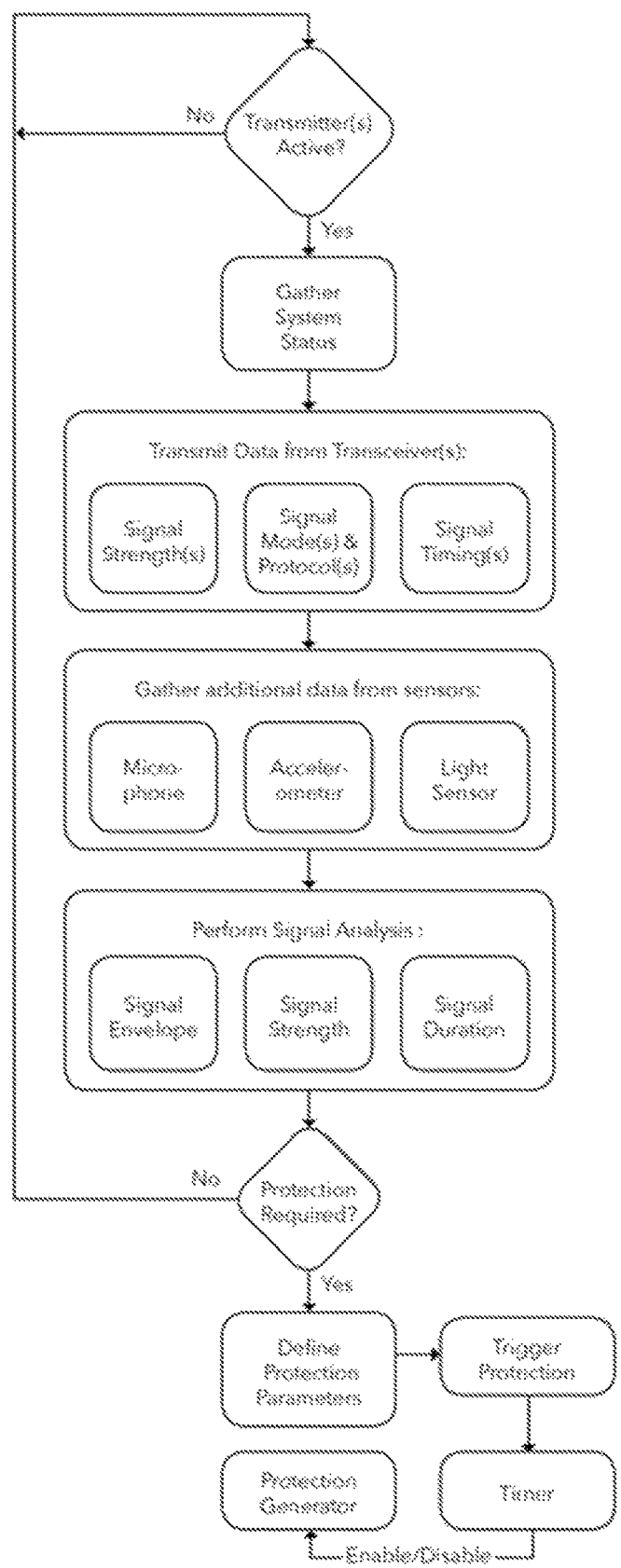
FIG. 2 illustrates an activity flow chart of the handset.

The operation of the embodiment shown in FIG. 1 is illustrated by the activity flow chart that is FIG. 2.

In the embodiment illustrated in FIG. 2 the system is initiated by the activity of the transceiver to gather information concerning the status of the system such as signal strength(s), signal mode(s) and protocol(s) and signal timing(s). Additionally information from additional sensors is collected and the information is analysed and recorded by the recordal facility, for example the signal envelope, the signal strength, the estimated proximity to the user and the duration of the signal may be analysed and recorded. On this basis it can be determined if a protective signal is required and the nature of the protective signal and the protective signal may then be activated for an interval determined by a timer. The nature and duration of the protective signal may also be recorded.

The invention claimed is:

1. A system for generation of a remedial signal for potentially harmful radiation that is emitted by a portable communication device which is electronic and battery powered comprising:
   a) a bioprotection system implemented directly within a handset of the portable communication device;
   b) a microprocessor which operates the portable communication device and is configured to access information from other components of the portable communication device separate from the bioprotection system;

c) a remedial signal module controlled by an algorithm in the microprocessor;

wherein the algorithm obtains information concerning radio frequency communications associated with the portable communication device and ensures that the remedial signal does not impair a function of the other components of the portable communication device by overruling the bioprotection system to ensure that the remedial signal is not activated or that the remedial signal is deactivated when the other components are in use; and wherein the other components include a camera of the portable communication device.

2. The system according to claim 1, wherein the portable communication device is a cellular telephone handset.

3. The system according to claim 2, wherein the remedial signal is generated by operation of the remedial signal module within the cellular telephone handset.

4. The system according to claim 1, wherein the information is used to determine if the remedial signal is required.

5. The system according to claim 1, wherein the information includes a mode of operation.

6. The system according to claim 1, wherein the information includes a power level and timing of a radio frequency signal of the radio frequency communications.

7. The system according to claim 1, wherein the information is used to determine a nature, a strength and a duration of the remedial signal that should be generated.

8. The system according to claim 1, wherein a strength of the remedial signal is greater than or equal to a strength of the potentially harmful radiation.

9. The system according to claim 1, wherein the remedial signal is continuously tailored depending on a mode of operation; and wherein the mode of operation includes a communications mode and a handset mode.

10. The system according to claim 1, wherein the information includes information from a plurality of additional sensors concerning a proximity of the portable communication device to a user; and wherein the plurality of additional sensors include a microphone, an accelerometer, and a light sensor.

11. A system for generation of a remedial signal for potentially harmful radiation that is emitted by a portable communication device which is electronic and battery powered comprising:

a) a handset as part of the portable communication device;
b) a bioprotection system implemented directly within the handset of the portable communication device;
c) a microprocessor which operates the portable communication device and is configured to access information from other components of the portable communication device separate from the bioprotection system;
d) a remedial signal module controlled by an algorithm in the microprocessor;

wherein the algorithm obtains information concerning radio frequency communications associated with the portable communication device including information from a plurality of additional sensors concerning a proximity of the portable communication device to a user;

wherein the algorithm ensures that the remedial signal does not impair a function of the other components of the portable communication device by overruling the bioprotection system to ensure that the remedial signal is not activated or that the remedial signal is deactivated when the other components are in use; and wherein the plurality of additional sensors include a microphone, an accelerometer, and a light sensor.

12. The system according to claim 1, wherein the remedial signal is generated by a remedial signal generator which is aligned with transmitters of the portable communication device to allow coupling of the remedial signal and the potentially harmful radiation.

13. The system according to claim 12, wherein the remedial signal generator comprises a coil aligned with the transmitters in the portable communication device.

14. The system according to claim 12, wherein the remedial signal generator includes the use of multiple coils.

15. The system according to claim 13, wherein a remedial device includes a user facing application that allows a user to access information associated with the remedial signal generator.

16. The system according to claim 15, wherein the access comprises viewing.

17. The system according to claim 15, wherein the user facing application allows the user to make operational changes to the remedial signal.

18. The system according to claim 15, wherein an icon on a screen of the handset of the portable communication device can provide the information about operation of the remedial device.

19. The system according to claim 11, wherein the other components include a camera of the portable communication device.

20. A system for generation of a remedial signal for potentially harmful radiation that is emitted by a portable communication device which is electronic and battery powered comprising:

a) a handset as part of the portable communication device;
b) a bioprotection system implemented directly within the handset;
c) a microprocessor which operates the portable communication device and is configured to access information from other components of the portable communication device separate from the bioprotection system; and
d) a remedial signal module is controlled by an algorithm in the microprocessor;

wherein the algorithm obtains information concerning radio frequency communications associated with the portable communication device and ensures that the remedial signal does not impair the function of the other components of the portable communication device by overruling the bioprotection system to ensure that the remedial signal is not activated or that the remedial signal is deactivated when the other components are in use; and wherein the other components include a camera of the portable communication device.

* * * * *